Neil R. Burch
Harold E. Childers
INVENTORS

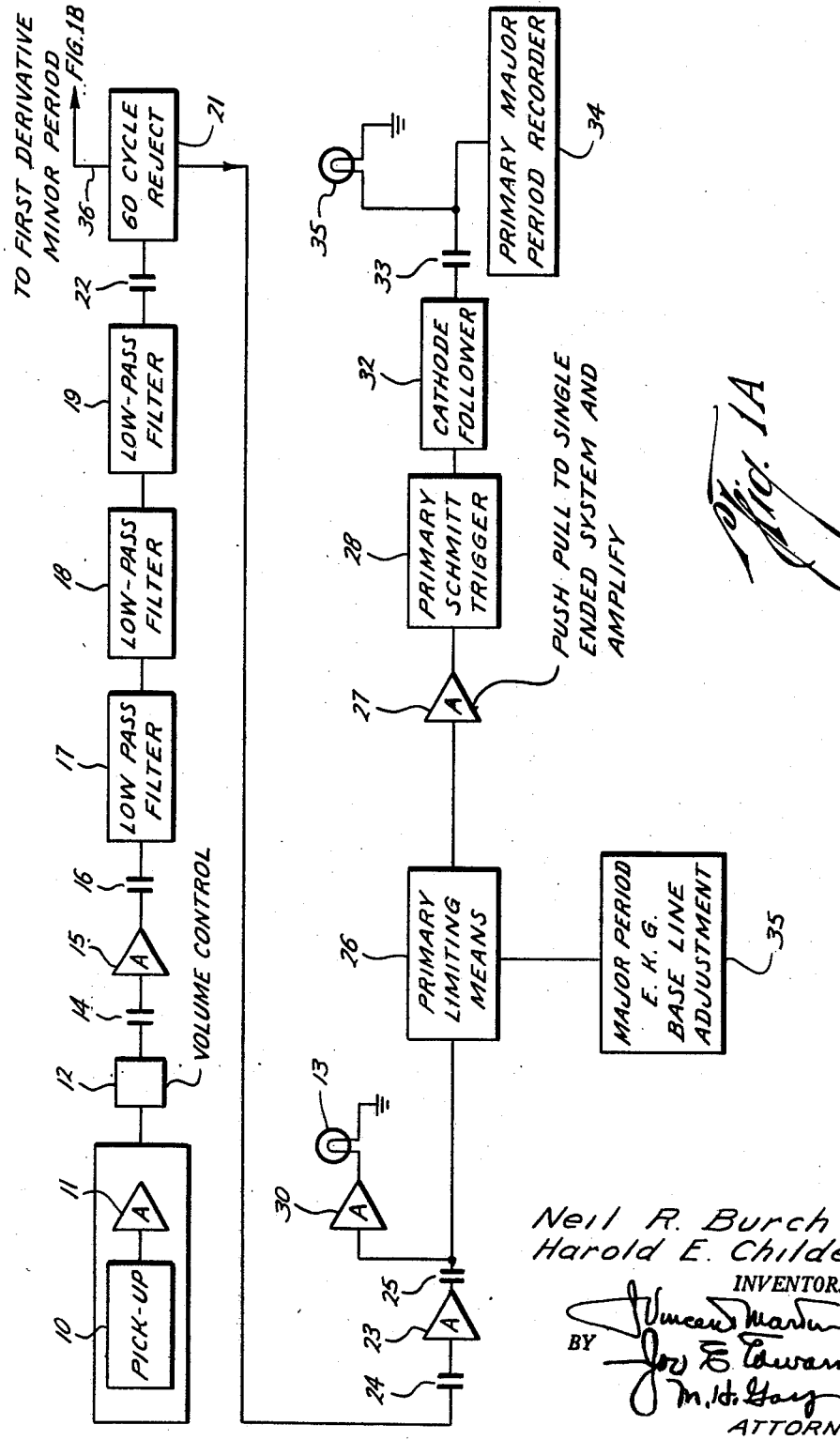

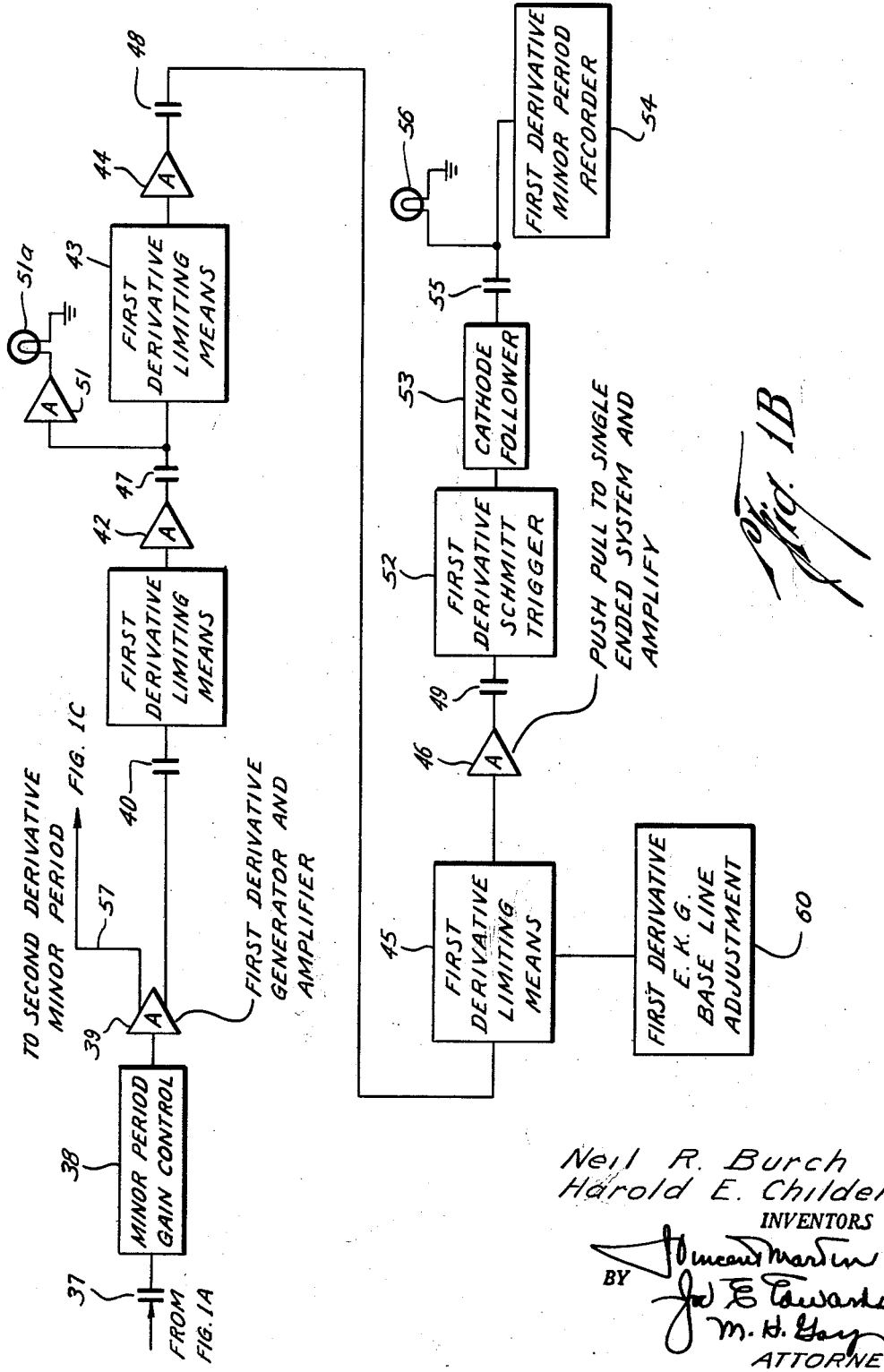

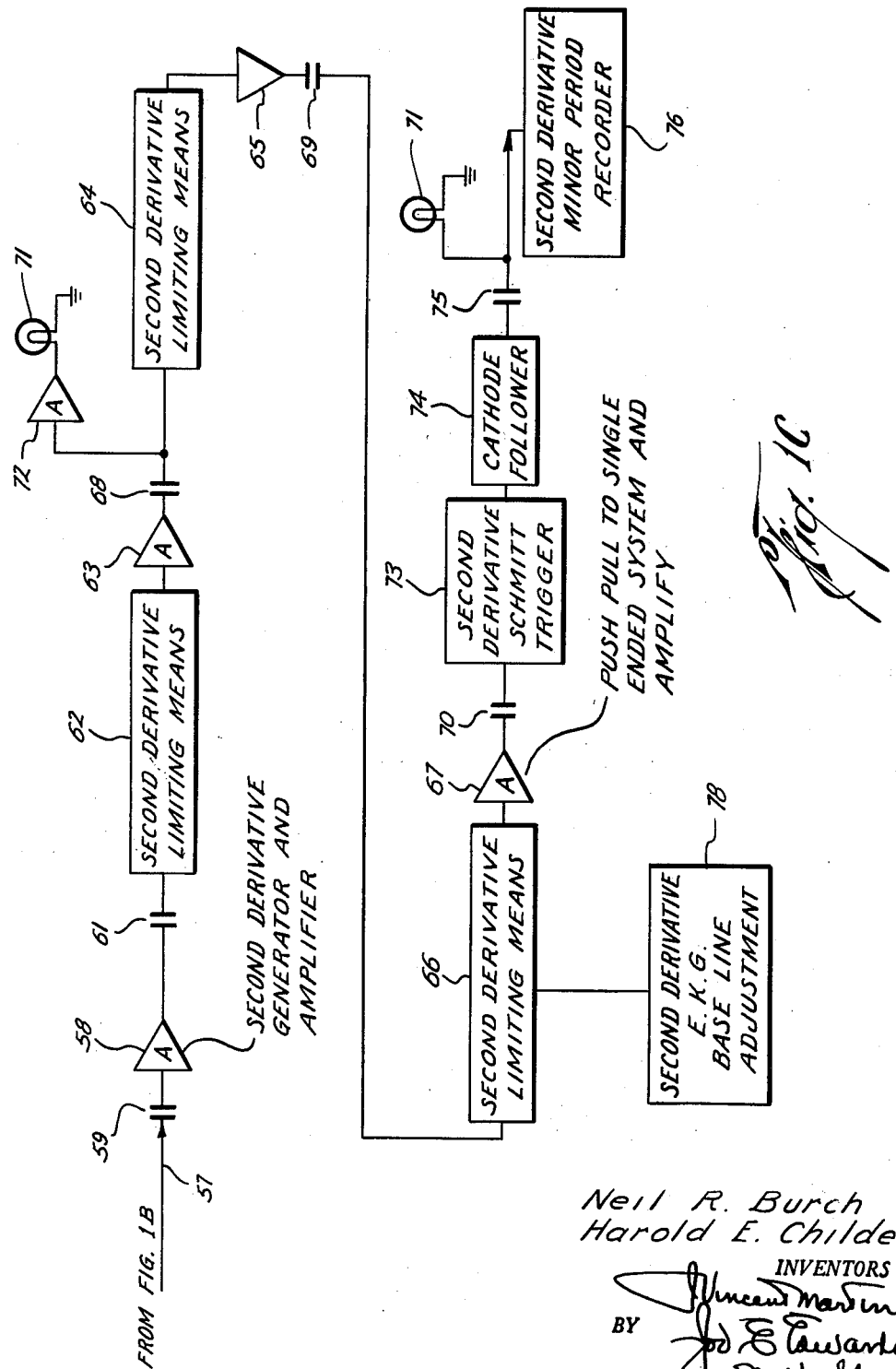

March 3, 1964 N. R. BURCH ETAL 3,123,768
APPARATUS INCLUDING TRANSMITTING AND RECEIVING MEANS
FOR ANALYZING APERIODIC WAVEFORMS
Filed April 5, 1961 11 Sheets-Sheet 5

Fig. 2B

SECOND DERIVATIVE OUTPUT

FIRST DERIVATIVE OUTPUT

Neil R. Burch
Harold E. Childers
INVENTORS

BY

ATTORNEYS

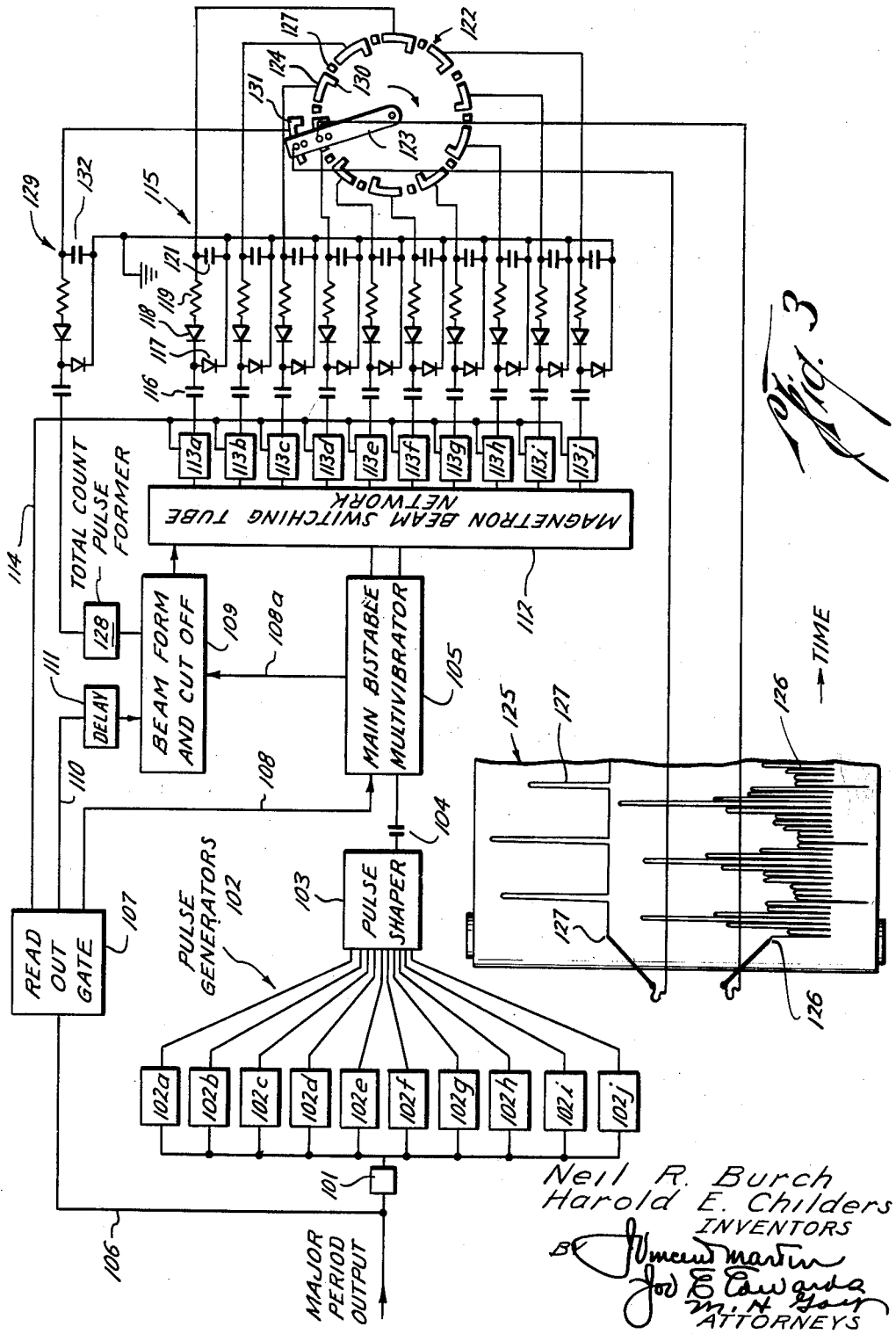

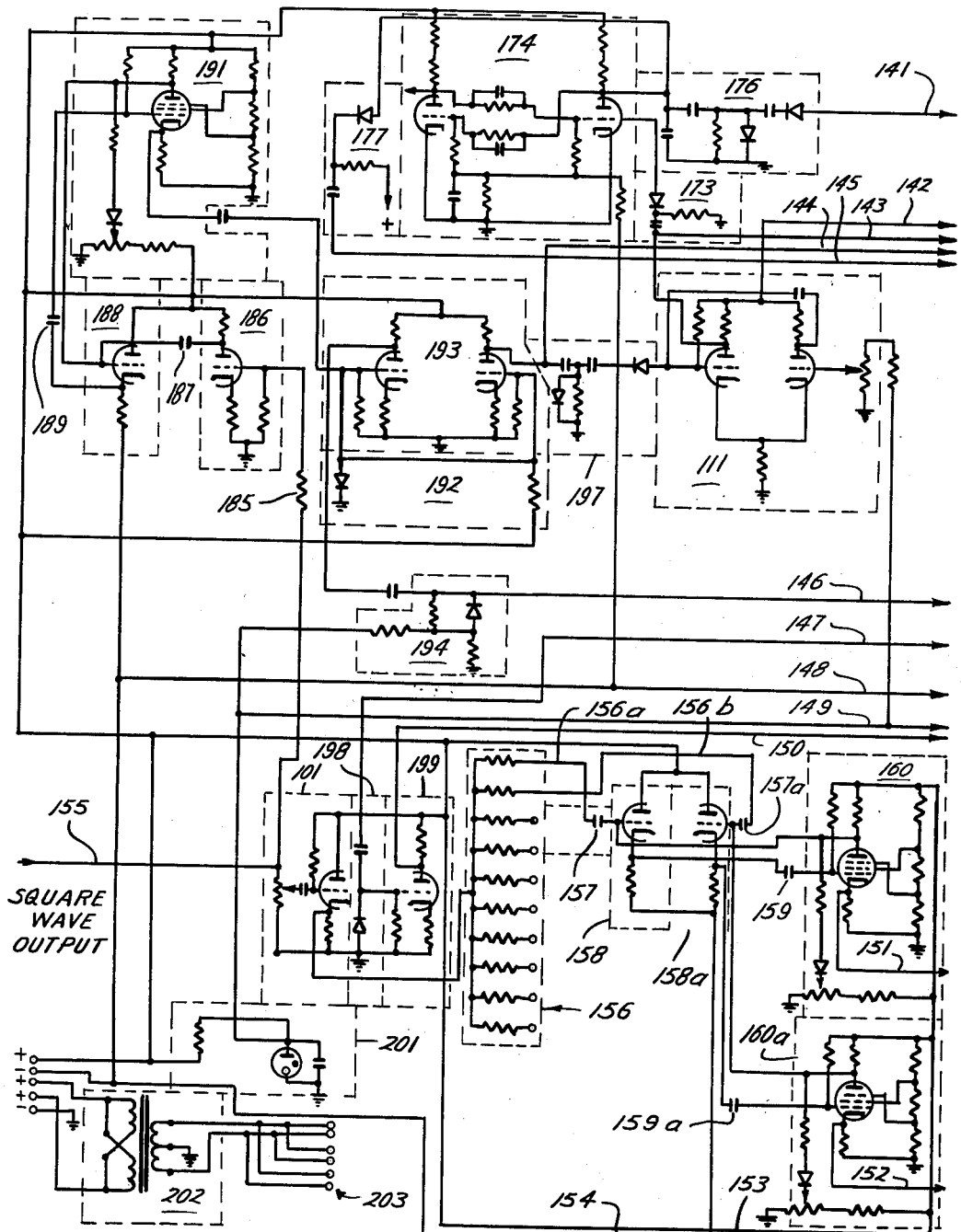

Neil R. Burch
Harold E. Childers
INVENTORS

PRIMARY OR BASE LINE CROSSES

FIRST DERIVATIVE OR MAXIMUM - MINIMUM

SECOND DERIVATIVE OR POINTS OF INFLICTION

PRIMARY

FIRST DERIVATIVE

SECOND DERIVATIVE

MAJOR PERIOD OUTPUT

FIRST DERIVATIVE OUTPUT

SECOND DERIVATIVE OUTPUT

Neil R. Burch
Harold E. Childers
INVENTORS

BY

ATTORNEYS

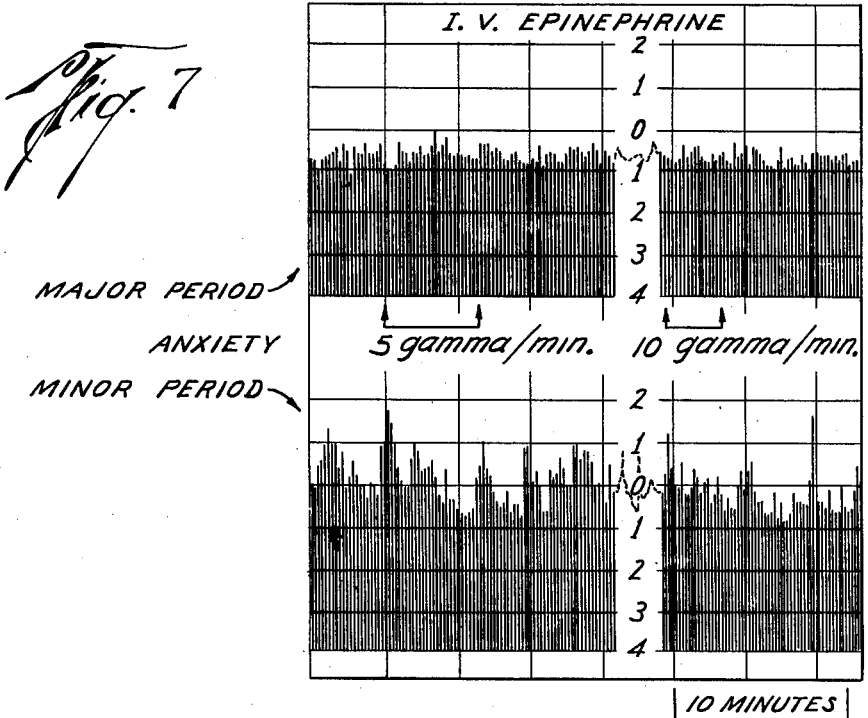
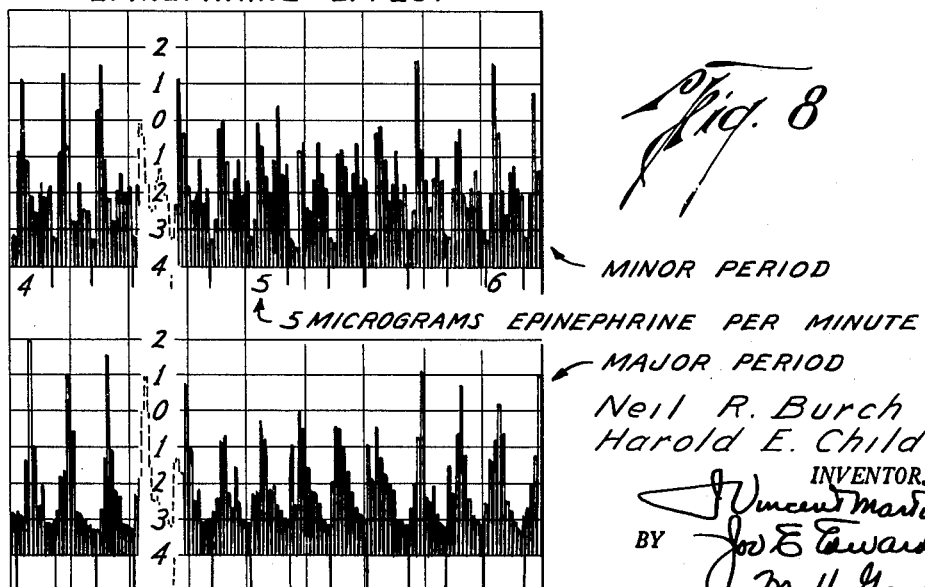

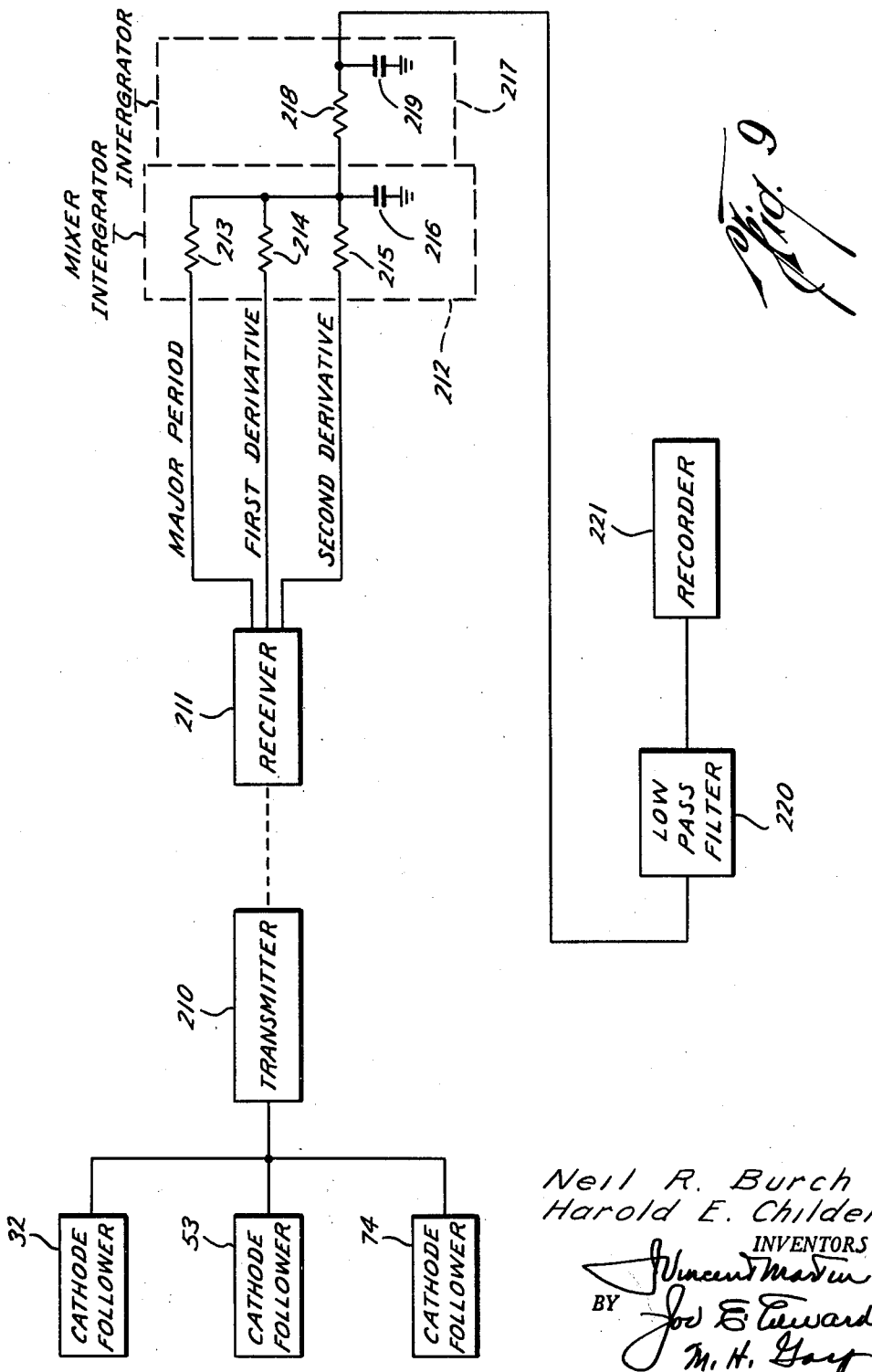

United States Patent Office 3,123,768
Patented Mar. 3, 1964

3,123,768
APPARATUS INCLUDING TRANSMITTING AND RECEIVING MEANS FOR ANALYZING APERIODIC WAVEFORMS
Neil R. Burch, 4619 Richmond Ave., and Harold E. Childers, 3718 Seminole, both of Houston, Tex.
Filed Apr. 5, 1961, Ser. No. 100,836
22 Claims. (Cl. 324—77)

This invention relates to analysis of wave shapes, and more particularly to apparatus for analyzing aperiodic waves and apparatus for transmitting and receiving signals.

There are many instances in which wave shapes will yield valuable information. For instance, the electroencephalogram (EEG); the galvanic skin response (GSR); and the electrocardiogram (EKG) are widely used. Analysis of other wave shapes will undoubtedly become more widely used with continued investigation to obtain empirical data on various wave forms. The greatest amount of work to date has been in EEG analysis, and this invention will be explained as applied to EEG; however, it will be understood that the invention has application in any field where wave shape analysis will yield useful information.

Waves analyzed in accordance with this invention may be transmitted on narrow frequency bands and received without the necessity of high fidelity equipment with amazing accuracy of reproduction.

It is an object of this invention to provide apparatus for analysis of wave shapes which will measure any or all of the base line crosses, maximum-minimum points or points of inflection of an aperiodic wave electronically with greater accuracy than presently possible.

Another object is to provide apparatus for analysis of wave shapes which will measure any or all of the base line crosses, maximum-minimum points or points of inflection of an aperiodic wave and record the number of similar base line crosses, maximum-minimum points or points of inflection occurring in an epoch of time.

A particular object is to provide a practical apparatus for measuring and recording more bits of data from wave forms, particularly EEG, GSR and EKG waves, than heretofore available.

Another object is to provide apparatus for converting base line crosses, maximum-minimum points or points of inflection of waves to forms which can be readily handled by electronic computers.

Another object is to provide apparatus for converting base line crosses, maximum-minimum points or points of inflection of waves to forms which can be readily handled by electronic computers and to provide computer apparatus for handling said data and recording total counts, counts of like bits of data, etc., occurring in an epoch of time.

Another object is to provide a method and apparatus for transmitting complex waves in a narrow frequency band.

Another object is to provide a method and apparatus for transmitting and receiving signals in which high quality signal reproduction may be attained without the necessity of using high fidelity receiving equipment.

Other objects, features and advantages of the invention will be apparent from the drawings, the specification and claims.

In the drawings, wherein an illustrative embodiment of this invention is shown, and wherein like numerals indicate like parts:

FIGURES 1A, 1B and 1C schematically illustrate appparatus for determining and recording base line crosses, maximum-minimum points or points of inflection of an aperiodic wave with FIGURE 1A directed primarily to the base line crosses, FIGURE 1B to the maximum-minimum points and FIGURE 1C to the points of inflection;

FIGURES 2A and 2B show in detail the circuitry shown schematically in FIGURES 1A, 1B and 1C except for the recorders;

FIGURE 3 illustrates schematically a preferred form of computer for handling each of the base line crosses, maximum-minimum points or points of inflection information generated by the circuitry shown in FIGURES 1A, 1B and 1C;

FIGURES 4A and 4B illustrate the circuitry of the computer shown schematically in FIGURE 3;

FIGURE 7 is a chart showing EEG total count on a subject given epinephrine intravenously;

FIGURE 8 is a chart showing EEG major period and second derivative spectral analysis on subject given epinephrine intravenously;

FIGURE 9 is a schematic illustration of a transmitting and receiving system for transmitting waves analyzed as illustrated in FIGURES 1A, 1B and 1C.

Figure 2A:
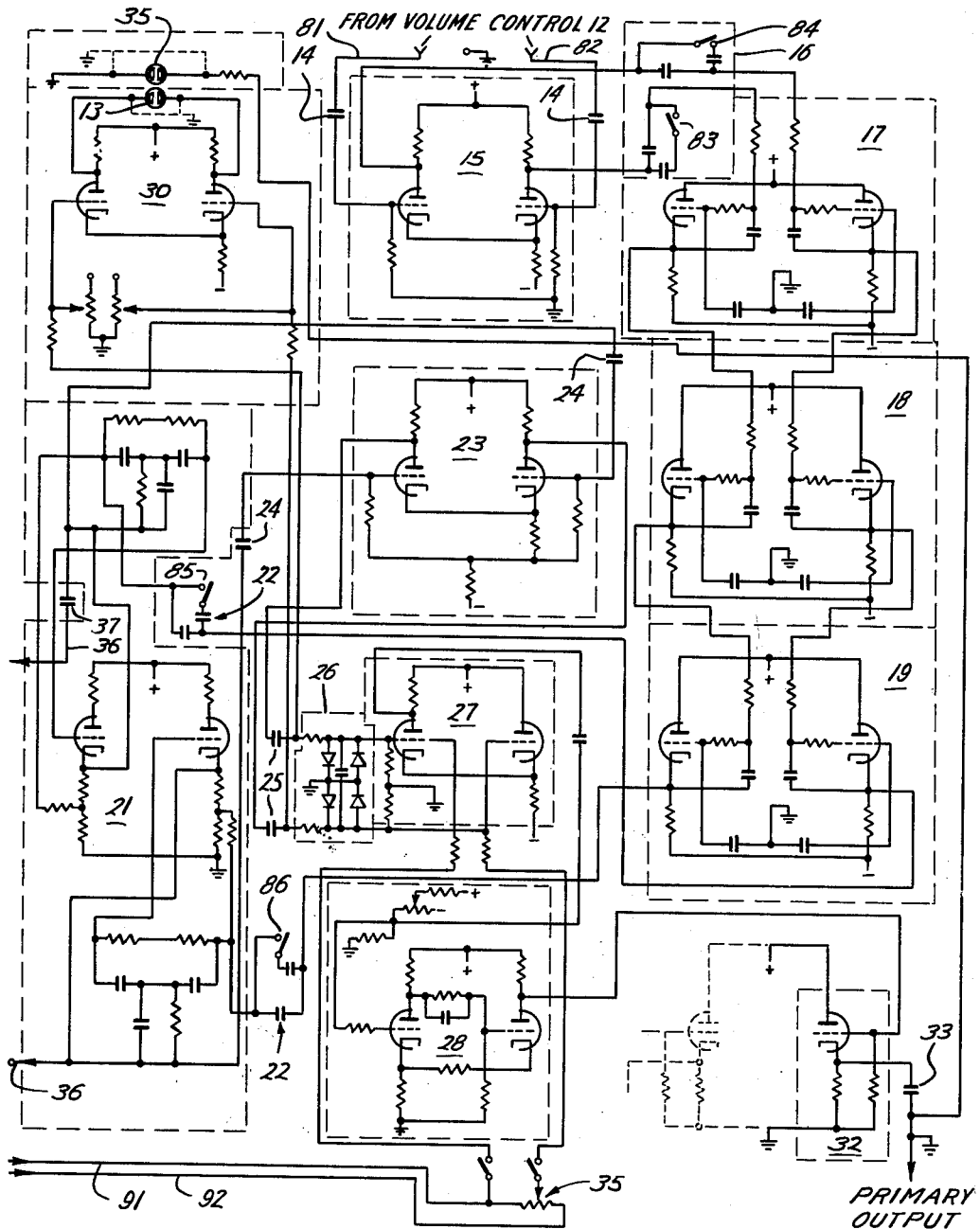

In practicing this invention the base line crosses of a wave are measured. They are amplified and squared to such a degree that the distance between successive base line crosses may be accurately determined. This squared wave is then fed into a computer of any desired design for such determinations as may be useful. For instance, a total count of base line crosses may be made. Waves of similar duration which occur during a selected epoch of time may be counted and the total number of waves of each selected time period recorded.

Before squaring of the primary wave, a first mathematical derivative of the primary wave is generated. The base line crosses of this wave will correspond with the maximum-minimum points of the primary wave. This first derivative wave may be amplified and squared to the degree desired and fed to a computer network such as used for the primary period output to record the desired bits of information relating to the maximum-minimum points of the original wave.

Before the first derivative is squared, a second mathematical derivative is taken from the first derivative to obtain at the base line crosses the point of inflection or change in slope of the primary wave. The second derivative is also passed through amplifying and squaring circuitry and the resultant wave fed to a computer of the type referred to above.

In other words, the primary wave, its analog first derivative and its analog second derivative are passed through zero detecting circuits that generate square waves having sides coincident in time with the zero crossings of the primary, first derivative and second derivative. The three square waves code as pulse width conversions and relate in real time the zero crossings of the primary waves, the maximum and minimum points of the wave (the first derivative zero) and the points of inflection of the wave (second derivative zero). The coded information may be directly displaced. If desired, the computing may relate first and second derivative base line cross square waves to the primary square wave and to each other. A third type of computer would provide for spectral analysis or band breakdown display of a discreet number of bands for each of the primary and derivative signals.

If desired, the three squared waves may be transmitted to a remote point before recording, or they may be transmitted and then mixed to reconstruct the original signal. As the pertinent bit of information is the time between base line crosses, the signal need utilize only a narrow band and high fidelity receiving equipment is not necessary.

Referring particularly to FIGURE 1A, the pickup indicated generally at 10 may be of any desired design to receive a wave to be studied. The wave might be an electrical wave, a pressure wave, a wave resulting from mechanical vibrations in a structure, or wave of any other origin which can be translated to an electrical form. Where the wave to be studied is an EEG wave, the pickup 10 will be provided by electrodes attached to the subject's head. Where the waves picked up are very weak, they are immediately amplified in amplifier 11. If desired, the pickup and the pre-amplifier 11 may be located in a shielded environment to protect the weak signal from outside electrical influence. The pickup and optional amplifier provide a means for receiving the wave to be studied and generating primary electrical signals having substantially the same wave form as the received wave.

The wave is preferably first fed through a volume control 12 and the volume turned up until the indicator light 13 glows. The volume control is then turned back until the light 13 is extinguished. The wave is then fed through the coupling capacitance 14 which eliminates any D.C. signals and thence to an amplifier 15. From amplifier 15 the wave is fed through another coupling capacitance 16 which eliminates D.C. signals to the series connected low pass filters 17, 18 and 19. The low pass filters provide means for filtering out all but A.C. signals in a selected range. The number of filters used will determine the degree of filtering out of waves above a selected frequency. By way of example, three series connected filters are preferred for EEG signals and they filter out all but A.C. signals below a selected frequency, preferably 100 c.p.s. Where an EKG wave is being recorded, the filters preferably filter out all signals above 50 c.p.s.

Where the low pass filters do not eliminate all signals above about 50 c.p.s., such as is the case with EEG analysis, a 60-cycle rejection filter 21 should be provided to eliminate any antifacts which may have been picked up from sources other than the wave to be recorded. Of course, the 60-cycle rejection filter would not be needed where the low pass filters 17, 18 and 19 filter out signals above 50 c.p.s. The 60-cycle rejection filter is connected to the last low pass filter through a coupling capacitance 22 to eliminate D.C. signals.

The output from the 60-cycle rejection filter is fed to a primary signal amplifying means 23 through a coupling capacitance 24 where the signal is further amplified. The output of amplifier 23 is connected through a branch line to light 13 through amplifier 30. As previously explained, the volume control 12 is turned up until the light 13 glows and then turned down until the light is extinguished, so that the desired amplitude signal will be passed through the system.

The signal from primary signal amplifying means 23 is fed through coupling capacitance 25 to primary signal limiting means 26.

Primary signal limiting means 26 clips the signal received from primary amplifying means 23 so that the output signal from the primary limiting means 26 is limited to that portion of the primary signal adjacent the base line cross.

Another primary amplifying means 27 receives signals from the primary limiting means and amplifies the clipped signal. Preferably, the amplifier 27 also converts the signal from push-pull to single-ended, as this simplifies the construction of the primary Schmitt trigger means 28 which receives signals from amplifier 27.

The primary Schmitt trigger means 28 squares the received signals to give them a very fast rise and fall time at the base line cross to facilitate fine measurement.

Figure 6:
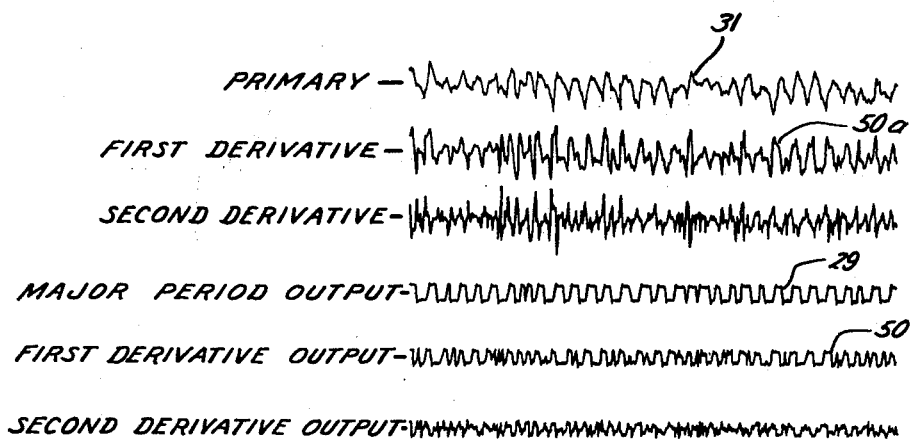
FIGURE 6 is a chart showing an EEG primary, first and second derivative and the major period and first and second derivative square wave outputs. (The fragmented appearance of the second derivative square wave output results from the high inertia pen system which cannot follow a true square wave at these frequencies.)

At this time the signal from the primary Schmitt trigger will have the appearance of the signal 29 in FIGURE 6. This signal represents in time the base line crosses of the primary signal from the primary signal generator 10 which is shown at 31 in FIGURE 6.

Preferably, the computer or recording means which handles the signal from the primary Schmitt trigger 28 will be in a separate chassis and in this case the signal from the primary Schmitt trigger 28 will pass to the chassis through a cathode follower 32 which will lower the impedance of the output signal from primary Schmitt trigger 28. The output signal passes through a coupling capacitance 33 and thence to the recorder which is represented in FIGURE 1A schematically at 34. Before reaching the recorder a branch line connects a lamp 35 to the input of the primary recorder 34 and this lamp will glow when a signal is passing to the recorder. As explained hereinabove, this recorder may be of any desired nature, and may simply record the square wave output of the Schmitt trigger means, or it may process the signals received in any desired manner and then record the integrated signals.

The illustrated system is one which is specially designed for EEG measurement and conversion to EKG measurement. In this conversion the low pass filters 17, 18 and 19 will be swapped out with other filters which filter out the signals above 50 c.p.s. Due to the characteristic of EEG signals, the base line cross will fall at the proper place on the signal. This is not true of EKG signals, and in order to use the same system for EKG analysis a major period EKG base line adjustment 35 is connected to the primary limiting means 26 and provides a means whereby the operator may adjust the position of the base line cross. This adjustment is made by the operator from a study of trial runs of signals through the system.

In accordance with this invention, means are provided for receiving primary signals from the primary signal generator and generating a first derivative signal from said primary signal. While this primary signal might be obtained at any point between pickup 10 and the primary limiting means 26, it is preferably obtained after the signal has gone through the low pass filters and the 60-cycle reject filter to eliminate the need of passing this signal through additional low pass filters and 60-cycle rejection filters. This signal is shown to be taken at 36 from the output of the 60-cycle rejection filter 21 of FIGURE 1A and to be fed to the first derivative system shown in FIGURE 1B. The signal is fed through the coupling capacitance 37 to the minor period gain control 38 which is adjusted while observing light 51a in the same manner as adjustment of the primary major period signal heretofore explained.

The first derivative generator and amplifier 39 receive the signal from the minor period gain control and both amplifies and generates a first derivative signal from said primary signal.

A plurality of alternately arranged series connected first derivative amplifying means and first derivative limiting means receive said first derivative signals from said first derivative generator 39 and alternately amplify and clip the first derivative signal. In the preferred embodiment the first derivative signal is fed through the coupling capacitance 40 to a first derivative limiting means 41, thence to the series connected first derivative amplifier 42 and in like manner in series through a first derivative limiting means 43, first derivative amplifier 44, first derivative limiting means 45 and first derivative amplifier 46.

Coupling capacitances 47, 48 and 49 are provided respectively in the output of successive first derivative amplifier to eliminate D.C. signals. The signal lamp 51a is connected to the system through its amplifier 51 at the output of first derivative amplifier 42.

It will be understood that each of the limiting networks clips the signal and limits it to that portion adjacent the base line cross. As many limiting means and amplifiers may be employed as desired to obtain the desired character of signal at the output of the last first derivative amplifier. Preferably, the last first derivative amplifier 46 also converts the signal from push-pull to single-ended signal to simplify construction of Schmitt trigger means 52.

The first derivative Schmitt trigger means 52 receives signals from the first derivative amplifier 46 and squares said first derivative signal.

Where a separate console for the recorder is employed, or for other reasons it is desired to reduce the impedance from the output of the Schmitt trigger 52, the cathode follower 53 may be employed. As in the case of the primary wave, the output from the Schmitt trigger 52 is fed to a first derivative minor period recorder 54 of any desired type to integrate and record the bits of information obtainable from the first derivative signal. As in the case of the major period wave, the output from the cathode follower is through a coupling capacitance and a lamp 56 is connected to the output to indicate the presence of signals.

The signal from the first derivative Schmitt trigger will have the appearance of the signal 50 in FIGURE 6. This signal represents in time the maximum-minimum points of the primary signal shown at 50a.

A first derivative EKG baseline adjustment is shown at 60 for converting the system for EKG analysis.

Reference is now made to FIGURE 10 where the second derivative portion of the system is shown. A second derivative is derived from the output of the first derivative generator. Referring to FIGURE 1B, it will be noted that a first derivative output from the first derivative generator 39 is conducted through line 57 to FIGURE 1C.

A second derivative generator 58 receives a first derivative signal from said first derivative generator 39 through coupling capacitance 59 and generates a second derivative signal. Preferably, the second derivative generator also amplifies this signal. The second derivative signal relates in real time the zero crossing of the points of inflection of the primary wave.

The output from the second derivative generator 58 passes through the coupling capacitance 61 to block passage of D.C. signals.

A plurality of alternately arranged and series connected second derivative amplifying means and second derivative limiting means receive the second derivative signal from the second derivative generator and alternately amplify and clip the second derivative signals. Preferably, the second derivative signal passes successively through the second derivative limiting means 62, the second derivative amplifier 63, the second derivative limiting means 64, the second derivative amplifier 65, the second derivative limiting means 66, and the second derivative amplifier 67. The output from successive amplifiers passes through coupling capacitances 68, 69 and 70, respectively. The second derivative limiting means limits the signal to that portion thereof adjacent the base line and, as with the other alternate amplifiers and limiters of the primary and first derivative circuits, results in a fast rise and fall time for the signal adjacent the base line.

At the output of amplifier 63 is a lamp 71 connected to the amplifier output through its own amplifier 72. In adjusting the minor period gain control 38 the operator makes certain that both lamps 39 of the first derivative circuit and lamp 71 of the second derivative circuit go on and then off as the gain is turned up and then down.

The amplifier 67 preferably also converts the signal from push-pull to single-ended to permit use of the simpler designed Schmitt trigger.

Second derivative Schmitt trigger means 73 receives the signal from second derivative amplifier 67 and squares the signal. The output from the Schmitt trigger passes through the cathode follower 74 to reduce the impedance of the signal and thence through coupling capacitance 75 to the second derivative minor period recorder 76.

The lamp 77 is provided at the output of the cathode follower to give continuous indication of signal flowing to the second derivative minor period recorder.

The second derivative minor period recorder may record the signal received or may integrate and record any of the bits of information available as in the case of the primary and first derivative recorders.

A second derivative EKG base line adjustment 78 is provided for conversion of the system from EEG to EKG analysis.

The output signal from the second derivative Schmitt trigger is shown at 79 in FIGURE 6. This signal represents in time the points of inflection of the primary signal but is distorted due to the high inertia pen system.

It might be noted that FIGURE 6 shows the primary wave, the first derivative wave from the first derivative generator, the second derivative wave from the second derivative generator, and the major period, first derivative and second derivative square wave outputs.

Particular reference is made to FIGURES 2A and 2B which show in detail the circuitry for converting the primary wave to squared major period, first and second derivative waves. For convenience elements are grouped and enclosed in dashed boxes for discussion purposes. The signal is received from the volume control 12 at input points 81 and 82. The various components discussed in the detailed consideration of FIGURES 1A, B and C are shown in dashed blocks in FIGURES 2A and 2B. These dashed blocks, as well as the several coupling capacitances, bear the same numerals as in the schematic diagram of FIGURES 1A, B and C. As the circuitry for amplifying, limiting, filtering, squaring, etc. as discussed in FIGURES 1A, B and C is well known to those skilled in the art, and the circuit diagram shown in FIGURES 2A and 2B clearly shows one form of carrying out each of these functions, a detailed discussion of each of the component sections of the circuit would be superfluous and will be omitted for the sake of brevity.

It might be noted that in addition to the base line adjustment 35, 60 and 78, there are several additional switches 83, 84, 85 and 86, all of which are shown in the open position. In using the system for EKG analysis these switches are all closed.

It will be noted that FIGURES 2A and 2B may be readily read by placing FIGURE 2A to the right of FIGURE 2B. The two outputs 36 from the 60-cycle rejection filter 21 to the minor period gain control 38 are shown to terminate at the left side of FIGURE 2A and to continue at the right side of FIGURE 2B.

Lines 91 and 92 interconnecting the several EKG adjustments 35, 60 and 78 also interconnect across the left hand side of FIGURE 2A to the right hand side of FIGURE 2B.

Figure 5:
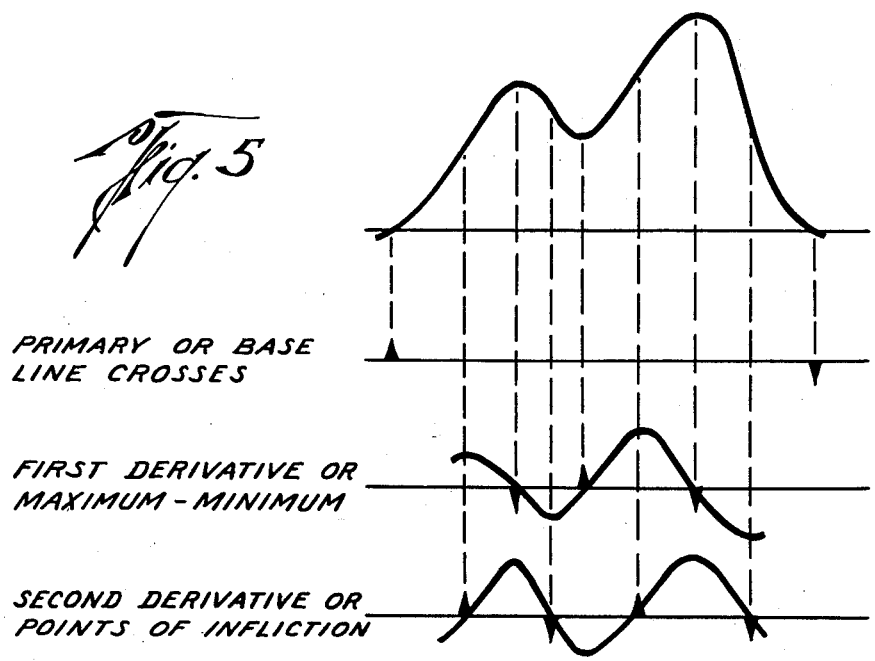
FIGURE 5 is a chart plotting the relationship of the primary, first and second derivative to a wave.

FIGURE 5 shows the relationship of the primary, first and second derivative signals from the primary, first and second derivative generators, respectively. It will be seen from a study of the three curves that the base line crosses of the first and second derivative signals relate in real time the maximum-minimum points of the primary signal and the points of inflection of the primary signal, respectively.

Reference is now made to FIGURE 3 wherein a computer-recorder is shown for providing a spectral analysis of the major period output from the primary Schmitt trigger 28 and a total count of such signals. Preferably, one of these computer-recorders is provided at each of the outputs of the primary, first derivative or second derivative Schmitt triggers. With three such computer-recorders an analysis of each wave form may be provided. Of course, any one, two or three of the waves in any desired combination might be fed to such computer-recorders if the desired information would be obtained from such combination. For instance, the primary and second derivative signals have been analyzed and used without the use of the first derivative signal.

The primary or major period output is fed into the computer-recorder through a cathode follower 101 which lowers the impedance level of the signal. The signal is then fed into a pulse generator which generates a pulse train with which to measure the length of the pulse received. Of course, where the computer-recorder receives the first or second derivative squared signal, the pulse generator generates first derivative or second derivative computer signals, as the case may be. The computer signal has a plurality of pulses determined by the width of the input signal.

The pulse generators provide a spectral analysis or band breakdown display of input signal of a duration corresponding to the half wave length of a sine wave of given frequency. For instance, ten bands might be employed as illustrated with one band representing signals having a frequency equivalent to 1 to 10 c.p.s., the next band representing signals equivalent to 10 to 20 c.p.s., and so on to 100 c.p.s., where the signal to be analyzed is thought to bear bits of interesting information varying between 1 and 100 c.p.s.

The pulse generators which are indicated generally at 102 thus preferably will have bands 102a through 102j. These might be considered to represent bands in the descending order of the frequency with 102a being equivalent to 90 to 100 c.p.s., 102b being equivalent to 80 to 90 c.p.s., and so on.

As the leading edge of a wave reaches the pulse generators 102a through 102j, it turns on all of them. If the pulse generators remain on for a period corresponding to 75 c.p.s., which falls within the range of generator 102c, then the generator 102a would have fired and 102b would have fired or turned off before the trailing edge of the signal reaches the pulse generators. At the time the trailing edge of the signal reaches the pulse generators, it turns off all of the generators which have not been turned off previously. Thus, generators c through j would be turned off simultaneously. As these generators are turned off they generate pulses simultaneously which results in an extra large pulse. There would result from the pulse generators a signal of two short pulses and a large pulse which would be representative of the squared signal fed into the computer-recorder. This signal is conveyed to the pulse shaper 103 where each of the three pulses of the signal are combined and shaped to composite signals of equal value.

From the above explanation it will be apparent that the greater the time between the beginning and ending of a signal, the greater will be the number of pulse generators 102a through 102j which will terminate before the end of the trailing edge of the squared signal reaches the pulse generators, and thus the pulse generators will have an output that is a plurality of pulses determined by the frequency of the squared input signal.

At this point it will be apparent that the use of the squared input signal to the computer permits a fine differentiation between signals of different lengths.

From the pulse shaper the signal, which will be assumed to have three pulses, is fed through the connecting capacitance 104 to the main bistable multi-vibrator 105. The multi-vibrator 105 generates a signal each time it is switched between alternate positions.

It might be noted that in response to the trailing edge of the previous signal, the readout gate 107 transmitted a pulse through line 108 to multi-vibrator 105 which turned the multi-vibrator to reset position.

The beam form and cutoff network 109 is activated by a negative pulse through line 108a from the multi-vibrator 105. When the pulses are applied through capacitor 104 to the main bistable multi-vibrator, the first pulse causes a positive pulse through line 108a, and the second pulse causes a negative pulse. It is this negative pulse that activates beam form and cutoff network 109, causing a beam to form on position 1 of beam switching tube 112. Thus, the first pulse from the pulse generators is always ignored eliminating from the count the extra pulse generated by the pulse generators.

The magnetron beam switching tube 112 provides a means for counting the number of pulses in each computer signal. The tube beam when switched successively by signal from the multi-vibrator progressively turns on and off output circuits 113a through 113j. When the beam is turned on by the beam former 109, the first output circuit 113a is activated. As the multi-vibrator goes through two switching positions in response to receiving its pulses from the pulse shaper 103, the switching tube 112 will switch its positions to output 113c.

At this time the trailing edge of the signal reaches readout gate 107 and a readout pulse is sent through line 114 to the readout circuits 113a through 113j and the circuit which is activated by the switching tube 112 gives an output pulse. At the end of the readout pulse, the readout gate 107 sends a pulse to the beam former and cutoff 109 which cuts off the switching tube 112 and also a pulse through 108 to the main multi-vibrator which resets the multi-vibrator to its off position. The pulse for cutting off the beam former passes through the delay 111 to permit the main multi-vibrator to be used before the beam former is reset. Thus the pulse transmitted through line 114 to the output circuit 113c of the switching tube will activate tube 113c before the switching tube is turned off.

Means indicated generally at 115 are provided for integrating computer output pulses during an epoch of time. There is a separate circuit provided for each output 113a through 113j. Referring to the output 113c, the output pulse passes through the coupling capacitance 116 to the integrator which includes diode 117, diode 118, resistance 119 and storage capacitance 121. The pulse passes through diode 118 and resistance 119 and is stored in the storage capacitance 121. The integrating means includes a commutator indicated generally at 122 having an arm 123 which makes one rotation during a selected epoch of time. As the arm 123 goes across the commutator segment 124 associated with the capacitor 121, it senses the charge on the capacitor and a signal is sent from the commutator arm 123 to a recording means indicated generally at 125 where pen 126 is positioned at a level proportional and in response to the charge of capacitor 121. As the arm 123 reaches the end of segment 124, a second grounding brush 130 discharges storage capacitance 121, thus resulting in the return of the pen arm 126 to zero position. Segment 127 is tied to a fixed potential and provides an epoch marker to pen 126.

It will thus be apparent that the reading of the line inscribed by pen 126 on chart 125 will reflect successively across 10 increments of chart movement the number of signals received in each band beginning with signals between the range of 1 to 10 c.p.s. and progressing in 10-cycle increments to the last position where the number of signals between 90 to 100 c.p.s. will be reflected.

The computer-recorder shown in FIGURE 3 also records the total number of square waves from the input signal. At the time that the beam forming circuit 109 is turned on a signal from this circuit energizes the total count pulse former 128. The total count pulse former emits a pulse to a storage circuit indicated generally at 129 which is the same as those employed with the switching tube 112. The commutator has a single segment 131 spaced radially outward from the several contacts associated with the storage system 115. As the commutator arm sweeps to a position where it engages this single segment 131, the capacitor 132 of the storage system 129 is sensed and the charge on the capacitor 132 effects movement of pen 127 to a position reflecting this charge. Thus pen 125 will reflect a value proportional to the number of pulses emitted by the total count pulse former 128 during the last epoch of time as determined by the speed of the commutator arm 123.

As the trailing edge of each readout pulse of each squared wave turns off the beam former 109 which in turn turns off the switching tube 112 and the multi-vibrator 105 is reset to off position, it will be appreciated that the system is instantly restored to a condition to receive the next square wave and to determine its length.

It will be understood that while the square wave fed to the recorder-computer has a positive and negative portion, the computer measures only one-half of each full wave. That is, the computer first finds a negative going edge of a square wave and then the positive going trailing edge of this same square wave. The computer does not see the interval of time between the positive going edge of the half wave and the negative going leading edge of the succeeding half wave. While it is apparent that the square wave signal could be inverted and the length of the other half of each wave determined, it is normally not considered to be necessary, at least in EEG and EKG analysis. If a complete analysis of any wave is desired, the same wave input to the computer shown in FIGURE 3 may be inverted and fed into a similar computer to yield the same information for the other half of the wave.

Figure 4B:
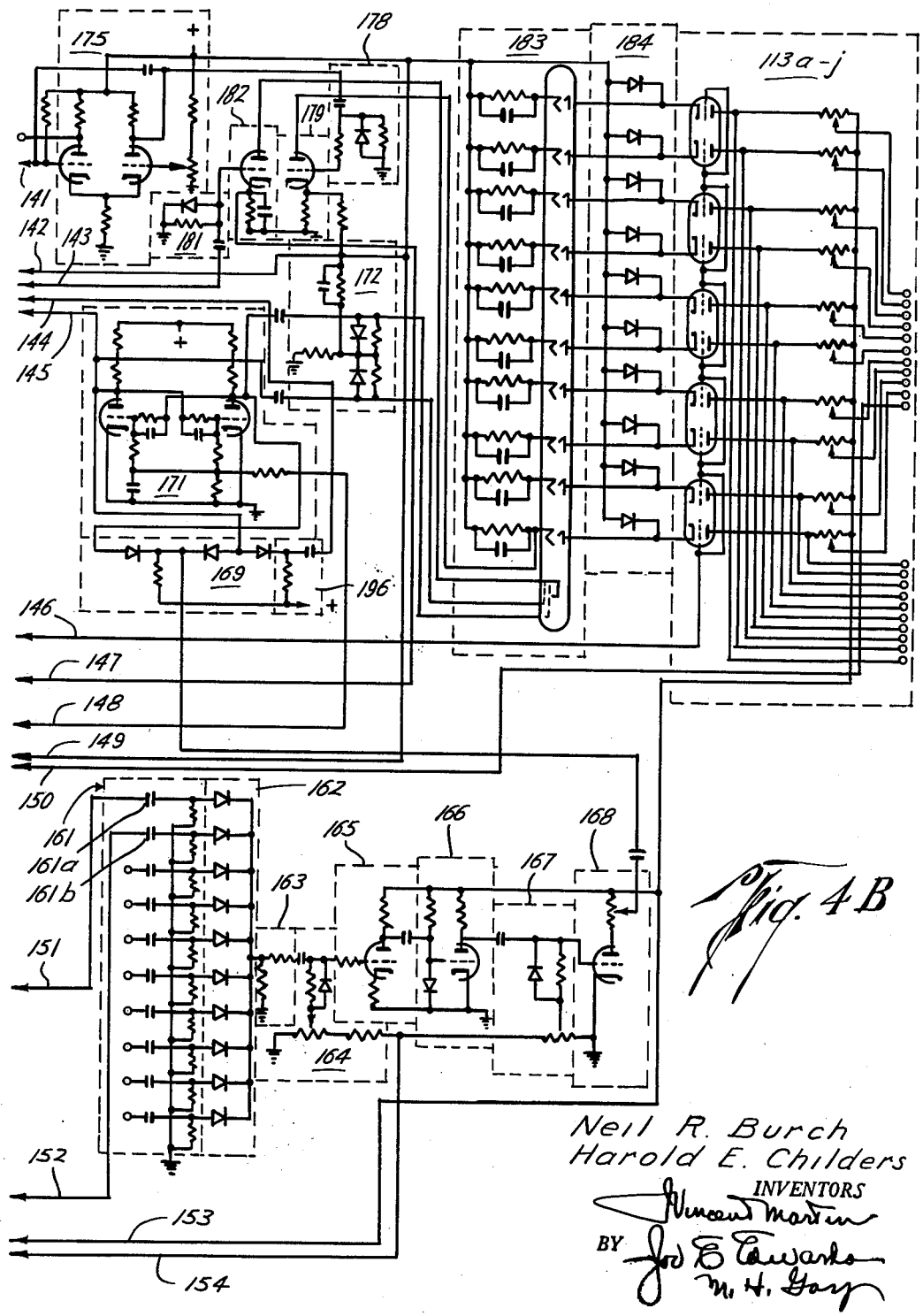

Reference is now made to FIGURES 4A and 4B which show the details of the circuitry shown in FIGURE 3. For convenience, elements are grouped and enclosed in dashed boxes for discussion purposes.

These drawings may best be read by placing FIGURE 4B to the right of FIGURE 4A. Conduits 141 through 154 interconnect the several components of the computer between the two sheets. The square wave output formed with the primary, first or second derivative Schmitt trigger is fed into the computer at 155 (FIGURE 4A) and thence to the cathode follower 101. From the cathode follower the signal passes through the pulse generator including isolation resistors 156. One resistor is provided for each of the bands 102a through 102j shown in FIGURE 3. The pulse generator also includes a coupling and differentiation network 157, cathode follower 158, coupling capacitance 159 and phantastron timer 160. These elements are duplicated at 157a, 158a, 159a and 160a and connected to a second isolation resistor of the group 156.

It will be noted that the elements 157, 158, 159 and 160 are connected to the uppermost isolation resistor 156a, and the elements 157a, 158a, 159a and 160a are connected to the isolation resistor 156b. The elements 157 through 160 are repeated and a network provided thereby is connected to each of the remaining isolation resistors of the group 156. Thus, there are ten each of the elements 157, 158, 159 and 160. All but two of these were omitted for the sake of brevity as they are repetitious and perform exactly the same function.

In the pulse generator the coupling and differentiation network 157 differentiates the square wave input giving a negative pulse at the beginning of a wave and a positive pulse at the end of the wave. The cathode follower 158 couples the plate of the phantastron timer 160 to its grid. This improves the recovery time of the timer circuit. The coupling capacitance 159 provides one of the parameters that determines the duration of the phantastron operation. The phantastron timer generates a pulse at a preset time that is determined by the band distribution of the computer.

The pulse shaper shown at 103 in FIGURE 3 includes a differentiator network 161, the isolation and rectifying diodes 162, the isolation and summing resistor 163, the bias adjusting and diode clamp 164, the amplifier 165, the inverter amplifier 166, the bias adjustment and diode clamp 167, and the limiter amplifier inverter 168.

Each of the differentiators shown in the block 161 is attached to the output of a phantastron timer such as 160. For instance, the differentiator 161a receives the output from the phantastron timer 160 and the differentiator 161b receives the output from the phantastron timer 160a. The other differentiators are attached to the omitted phantastron timers.

The differentiators 161 produce very short duration pulses from the output of the phantastrons 160. The isolation and rectifying diodes 162 pass the positive pulse from the differentiators and prevent pulses from parallel circuits from causing malfunction of the phantastron timer. The isolation and forming resistors 163 mix the pulses out of the ten phantastron timers. The bias adjust and diode clamp 164 clamps the negative base line at a fixed value below the cutoff and the following stages to eliminate low amplitude circuit noise.

The amplifier 165 amplifies the signal and eliminates low level noise that is in the cutoff region of the circuit. The inverter amplifier 166 changes the polarity of the signal from negative to positive. The bias adjust and diode clamp clamps the base line at a fixed value. The limiter amplifier inverter 168 limits the amplitude of the pulses and changes their polarity from positive to negative.

The main bistable multi-vibrator 105 includes the isolation network 169 for isolating the driving pulses from the reset pulses for the bistable multi-vibrator. The main bistable multi-vibrator circuit shown at 171 creates drive for the alternate grids of the magnetron beam switching tube 112 when driving pulses are applied. The main bistable multi-vibrator circuit also includes the biasing network 172 for biasing the grids of the magnetron beam switching tube.

The beam form and cutoff 109 includes the beam forming bistable multi-vibrator 174 which forms a beam on the first position of the magnetron beam switching tube after a delay time determined by the beam forming monostable multi-vibrator 175 (FIGURE 4B). The beam form and cutoff also includes the pulse former 176 (FIGURE 4A) for triggering the beam forming monostable multi-vibrator 175 with a negative pulse; the pulse forming network 177 which forms a negative pulse at first negative going cycle of the main bistable multi-vibrator; the pulse forming network 178 (FIGURE 4B) for the beam forming tube; and the beam forming tube 179 which applies negative pulse to spade 1 of the magnetron beam switching tube 112 causing the beam to form. The beam form and cutoff 109 also includes a pulse forming network 181 and 173 which forms a negative pulse at the trailing edge of the reset delay monostable multi-vibrator pulse; and a beam cutoff tube 182 which causes the beam to be cut off in the magnetron beam switching tube when a negative pulse is applied to its grid.

The magnetron beam switching tube network 112 includes the tube 183 and the isolation diodes 184. The tube is a 10-position band-determining device which switches the beam from position 1 through position 10 in accordance with the number of pulses received from the pulse generator 102. The isolation diodes 184 provide target voltage for the magnetron beam switching tube 183.

The output circuits 113a through 113j are provided by the several tubes and potentiometers. When the readout pulse occurs the tube corresponding to the position of the beam gives a readout pulse, then the potentiometer associated with this tube determines the amplitude of the readout pulse that goes into storage in the storage system 115 (FIGURE 3).

Reference is now made to readout gate 107. This gate system includes isolation resistor 185; amplifier inverter 186 for changing the polarity of the signal; the coupling and differentiating network 187 which differentiates the square wave input giving a negative pulse at the beginning of the wave and a positive pulse at the end of the wave. The readout gate also includes the cathode follower 188 which couples the plate of the phantastron timer to its grid and improves the recovery time of the timer circuit; the coupling capacitance 189 which is one of the determining parameters of the readout pulse duration; the phantastron timer 191 for generating the readout pulse, and the diode clamp 192 for establishing a zero baseline of the signal. The readout gate also includes the inverter distribution amplifier 193 which amplifies and inverts the signal, the clamping and biasing network 194 which establishes the bias below the cutoff value of the readout tubes; the differentiating network 196 (FIGURE 4B) which generates a short negative pulse for resetting the main bistable multi-vibrator, and the pulse former 197 (FIGURE 4A) which generates negative pulse which is used to drive the reset delay monostable multi-vibrator 111.

The total count pulse former 128 is provided by the pulse-forming network 198 and the amplifier 199.

Regulator 201 regulates D.C. input voltage to the computer.

A.C. filament current is supplied to the several tubes from stepdown transformer 202 through leads shown generally at 203 which are connected to the several filaments (not shown).

In FIGURE 7 there is shown a composite data reduction of two 15-minute EEG runs. The major period shows average activity throughout the run. The minor period reflects activity during spontaneous anxiety while receiving 5-gamma per minute epinephrine and to a much lesser extent during 10-gamma per minute epinephrine. The total count peaks during the minor period at the +1 level indicate anxiety.

FIGURE 8 shows repetitive 10-second epochs with 10 bands in each epoch. The band distribution is given in the table below:

*Band Distribution*

| Band | Major Period (equivalent frequency) in c.p.s. | Minor Period (equivalent frequency) in c.p.s. |
| --- | --- | --- |
| 1 | 1.5–3.5 | 1.5–10 |
| 2 | 3.5–5 | 10–20 |
| 3 | 5–7.5 | 20–30 |
| 4 | 7.5–10.5 | 30–40 |
| 5 | 10.5–13.5 | 40–50 |
| 6 | 13.5–18.5 | 50–60 |
| 7 | 18.5–30 | 60–70 |
| 8 | 30–50 | 70–80 |
| 9 | 50–80 | 80–90 |
| 10 | 80–100 | 90–100 |

In FIGURE 8 there is shown a 2-minute section of record of the onset of the epinephrine effect using spectral analysis. The left of the figure indicates resting and the right portion of the figure indicates anxiety. In general, during the major period sleep has more low frequency signals and the second derivative minor period (being the minor period shown) has more high frequency count. During arousal, both the major and minor period have an increased high frequency count. During resting the major period peaks at about band 4, while the minor period peaks at about bands 2 and 3.

Reference is now made to FIGURE 9 which illustrates a system to be used with the system shown in FIGURES 1A, 1B and 1C for transmitting the original signal to a remote point and then reconstructing the wave.

Square waves can be transmitted over very narrow frequency bands. Thus, the output from cathode followers 32, 53 and 74 of FIGURES 1A, 1B and 1C, respectively, may be readily transmitted through a transmitter of any desired design to a remote point either by wire or by radio. They may be received with any desired receiving system.

We have discovered that complex waves can be broken down as discussed hereinabove, transmitted to a remote point, and then reconstructed into the original wave with an amazingly faithful reproduction of the original wave. As the only pertinent bit of information transmitted is the time between base line crosses, high fidelity equipment is not needed for receiving and reconstructing the original signal.

In the illustrated embodiment, the signal from cathode followers 32, 53 and 74 are transmitted to a remote point by transmitter 210 and received at the remote point by receiver 211. From the receiver the major first derivative and second derivative signals are fed to the mixer integrator 212. The major first and second derivative signals pass through resistances 213, 214 and 215, respectively, and into the storage capacitor 216. The discharge from the storage capacitor 216 will resemble the form of the original wave. To more closely approximate the original wave, the output from the mixer integrator 212 is fed into a second integrator 217 where the composite signal flows through resistance 218 into storage capacitor 219. The output from capacitor 219 more closely resembles the original signal than the output from the mixer integrator 212.

Preferably the output from the integrator 217 passes through a low pass filter 220 which eliminates any signals having a frequency greater than those at the output of the cathode followers 32, 53 and 74 to give a more truthful reproduction of the original signal. This composite signal may then be recorded by recorder 221 or treated in any desired manner, such as being fed into a computer, etc.

Experience has indicated that a complex wave may be reconstructed with approximately 95% fidelity to the original wave. Of course, a sine wave could be reconstructed with substantially 100% fidelity.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. Apparatus for analyzing wave shapes comprising, means for receiving waves and generating primary electrical signals having substantially the same wave form as the received wave, primary signal amplifying means receiving primary signals from said generator means and amplifying the primary signals, primary signal limiting means receiving primary signals from said primary signal amplifying means and clipping said received signals, another primary signal amplifying means amplifying said clipped primary signal, primary signal Schmitt trigger means receiving signals from said another amplifying means and squaring said signals, recording means receiving and recording said squared primary signal, means receiving primary signals from said primary signal generator and generating a first derivative signal from said primary signal, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, and recording means receiving and recording said squared first derivative signals.

2. Apparatus for analyzing wave shapes comprising, means for receiving waves and generating primary electrical signals having substantially the same wave form as the received waves, primary signal amplifying means receiving primary signals from said generator means and amplifying the signals, primary signal limiting means receiving primary signals from said primary signal amplifying means and clipping said received signals, another primary signal amplifying means amplifying said clipped primary signals,, primary signal Schmitt trigger means receiving signals from said another amplifying means and squaring said signals, recording means receiving and recording said squared primary signals, means receiving primary signals from said primary signal generator and generating a first derivative signal from said primary signal, means receiving first derivative signals from said first derivative generator and generating a second derivative signal from said first derivative signal, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, and recording means receiving and recording said squared second derivative signals.

3. Apparatus for analyzing wave shapes comprising, means for receiving waves and generating primary electrical signals having substantially the same wave form as the received waves, primary signal amplifying means receiving primary signals from said generator means and amplifying the signals, primary signal limiting means receiving primary signals from said primary signal amplifying means and clipping said received signals, another primary signal amplifying means amplifying said clipped primary signals, primary signal Schmitt trigger means receiving signals from said another amplifying means and squaring said signals, recording means receiving and recording said squared primary signals, means receiving primary signals from said primary signal generator and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, recording means receiving and recording said squared first derivative signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, and recording means receiving and recording said squared second derivative signals.

4. Apparatus for analyzing wave shapes comprising, means for receiving waves and generating primary electrical signals having substantially the same wave form as the received waves, filter means receiving primary signals from said receiving and generating means for filtering out all but A.C. signals in a selected range, primary signal amplifying means receiving primary signals from said filter means and amplifying the filtered signals, primary signal limiting means receiving primary signals from said primary signal amplifying means and clipping said received signals, another primary signal amplifying means amplifying said clipped primary signals, primary signal Schmitt trigger means receiving signals from said another amplifying means and squaring said signals, recording means receiving and recording said squared primary signals, means receiving primary signals from said filter means and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, and recording means receiving and recording said squared first derivative signals.

5. Apparatus for analyzing wave shapes comprising, means for receiving waves and generating primary electrical signals having substantially the same wave form as the received waves, filter means receiving primary signals from said receiving and generating means for filtering out all but A.C. signals in a selected range, primary signal amplifying means receiving primary signals from said filter means and amplifying the filtered signals, primary signal limiting means receiving primary signals from said primary signal amplifying means and clipping said received signals, another primary signal amplifying means amplifying said clipped primary signals, primary signal Schmitt trigger means receiving signals from said another amplifying means and squaring said signals, recording means receiving and recording said squared primary signals, means receiving primary signals from said filter means and generating first derivative signals from said primary signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, and recording means receiving and recording said squared second derivative signals.

6. Apparatus for analyzing wave shapes comprising, means for receiving waves and generating primary electrical signals having substantially the same wave form as the received waves, filter means receiving primary signals from said receiving and generating means for filtering out all but A.C. signals in a selected range, primary signal amplifying means receiving primary signals from said filter means and amplifying the filtered signals, primary signal limiting means receiving primary signals from said primary signal amplifying means and clipping said received signals, another primary signal amplifying means amplifying said clipped primary signals, primary signal Schmitt trigger means receiving signals from said another amplifying means and squaring said signals, recording means receiving and recording said squared primary signals, means receiving primary signals from said filter means and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, recording means receiving and recording said squared first derivative signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, and recording means receiving and recording said squared second derivative signals.

7. Apparatus for analyzing wave shapes comprising, means for receiving waves and generating primary electrical signals having substantially the same wave form as the received wave, means receiving primary signals from said primary signal generator and generating a first derivative signal from said primary signal, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said derivative signals, and recording means receiving and recording said squared first derivative signals.

8. Apparatus for analyzing wave shapes comprising, means for receiving waves and generating primary electrical signals having substantially the same wave form as the received waves, means receiving primary signals from said primary signal generator and generating a first derivative signal from said primary signal, means receiving first derivative signals from said first derivative generator and generating a second derivative signal from said first derivative signal, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, and recording means receiving and recording said squared second derivative signals.

9. Apparatus for analyzing wave shapes comprising, means for receiving waves and generating primary electrical signals having substantially the same wave form as the received waves, means receiving primary signals from said primary signal generator and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, recording means receiving and recording said squared first derivative signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, and recording means receiving and recording said squared second derivative signals.

10. Apparatus for analyzing wave shapes comprising, means for receiving waves and generating primary electrical signals having substantially the same wave form as the received wave, primary signal amplifying means receiving primary signals from said generator means and amplifying the primary signals, primary signal limiting means receiving primary signals from said primary signal amplifying means and clipping said received signals, another primary signal amplifying means amplifying said clipped primary signal, primary signal Schmitt trigger means receiving signals from said another amplifying means and squaring said signals, means receiving said squared primary signals and generating a primary computer signal for each primary signal received, each primary computer signal having a plurality of pulses determined by the frequency of a squared primary signal, means for counting the number of pulses in each primary computer signal, means for integrating like primary computer signals during an epoch of time, means for recording said integrated signals, means receiving primary signals from said primary signal generator and generating a first derivative signal from said primary signal, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, means receiving said squared first derivative signals and generating a first derivative computer signal for each first derivative signal received, each first derivative computer signal having a plurality of pulses determined by the frequency of a squared first derivative signal, means for counting the number of pulses in each first derivative computer signal, means for integrating like first derivative computer signals during an epoch of time, and means for recording said integrated signals.

11. Apparatus for analyzing wave shapes comprising, means for receiving waves and generating primary electrical signals having substantially the same wave form as the received waves, primary signal amplifying means receiving primary signals from said generator means and amplifying the signals, primary signal limiting means receiving primary signals from said primary signal amplfying means and clipping said received signals, another primary signal amplifying means amplifying said clipped primary signals, primary signal Schmitt trigger means receiving signals from said another amplifying means and squaring said signals, means receiving said squared primary signals and generating a primary computer signal for each primary signal received, each primary computer signal having a plurality of pulses determined by the frequency of a squared primary signal, means for counting the number of pulses in each primary computer signal, means for integrating like primary computer signals during an epoch of time, means for recording said integrated signals, means receiving primary signals from said primary signal generator and generating a first derivative signal from said primary signal, means receiving first derivative signals from said first derivative generator and generating a second derivative signal from said first derivative signal, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, means receiving said squared derivative signals and generating a second derivative computer signal for each second derivative signal received, each second derivative computer signal having a plurality of pulses determined by the frequency of a squared second derivative signal, means for counting the number of pulses in each second derivative computer signal, means for integrating like second derivative computer signals during an epoch of time, and means for recording said integrated signals.

12. Apparatus for analyzing wave shapes comprising, means for receiving waves and generating primary electrical signals having substantially the same wave form as the received waves, primary signal amplifying means receiving primary signals from said generator means and amplifying the signals, primary signal limiting means receiving primary signals from said primary signal amplfying means and clipping said received signals, another primary signal amplifying means amplifying said clipped primary signals, primary signal Schmitt trigger means receiving signals from said another amplifying means and squaring said signals, means receiving said squared primary signals and generating a primary computer signal for each primary signal received, each primary computer signal having a plurality of pulses determined by the frequency of a squared primary signal, means for counting the number of pulses in each primary computer signal, means for integrating like primary computer signals during an epoch of time, means for recording said integrated signals, means receiving primary signals from said primary signal generator and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, means receiving said squared first derivative signals and generating a first derivative computer signal for each first derivative signal received, each first derivative computer signal having a plurality of pulses determined by the frequency of a squared first derivative signal, means for counting the number of pulses in each first derivative computer signal, means for integrating like first derivative computer signals during an epoch of time, means for recording said integrated signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, means receiving said squared second derivative signals and generating a second derivative computer signal for each second derivative signal received, each second derivative computer signal having a plurality of pulses determined by the frequency of a squared second derivative signal, means for counting the number of pulses in each second derivative computer signal, means for integrating like second derivative computer signals during an epoch of time, and means for recording said integrated signals.

13. Apparatus for analyzing wave shapes comprising, means for receiving waves and generating primary electrical signals having substantially the same wave form as the received waves, filter means receiving primary signals from said receiving and generating means for filtering out all but A.C. signals in a selected range, primary signal amplifying means receiving primary signals from said filter means and amplifying the filtered signals, primary signal limiting means receiving primary signals from said primary signal amplifying means and clippng said received signals, another primary signal amplifying means amplifying said clipped primary signals, primary signal Schmitt trigger means receiving signals from said another amplifying means and squaring said signals, means receiving said squared primary signals and generating a primary computer signal for each primary signal received, each primary computer signal having a plurality of pulses determined by the frequency of a squared primary signal, means for counting the number of pulses in each primary computer signal, means for integrating like primary computer signals during an epoch of time, means for recording said integrated signals, means receiving primary signals from said filter means and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, means receiving said squared first derivative signals and generating a first derivative computer signal for each first derivative signal received, each first derivative computer signal having a plurality of pulses determined by the frequency of a squared first derivative signal, means for counting the number of pulses in each first derivative computer signal, means for integrating like first derivative computer signals during an epoch of time, and means for recording said integrated signals.

14. Apparatus for analyzing wave shapes comprising, means for receiving waves and generating primary electrical signals having substantially the same wave form as the received waves, filter means receiving primary signals from said receiving and generating means for filtering out all but A.C. signals in a selected rangs, primary signal amplifying means receiving primary signals from said filter means and amplifying the filtered signals, primary signal limiting means receiving primary signals from said primary signal amplifying means and clipping said received signals, another primary signal amplifying means amplifying said clipped primary signals, primary signal Schmitt trigger means receiving signals from said another amplifying means and squaring said signals, means receiving said squared primary signals and generating a primary computer signal for each primary signal received, each primary computer signal having a plurality of pulses determined by the frequency of a squared primary signal, means for counting the number of pulses in each primary computer signal, means for integrating like primary computer signals during an epoch of time, means for recording said integrated signals, means receiving primary signals from said filter means and generating first derivative signals from said primary signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, means receiving said squared second derivative signals and generating a second derivative computer signal for each second derivative signal received, each second derivative computer signal having a plurality of pulses determined by the frequency of a squared second derivative signal, means for counting the number of pulses in each second derivative computer signal, means for integrating like second derivative computer signals during an epoch of time, and means for recording said integrated signals.

15. Apparatus for analyzing wave shapes comprising, means for receiving waves and generating primary electrical signals having substantially the same wave form as the received waves, filter means receiving primary signals from said receiving and generating means for filtering out all but A.C. signals in a selected range, primary signal amplifying means receiving primary signals from said filter means and amplifying the filtered signals, primary signal limiting means receiving primary signals from said primary signal amplifying means and clipping said received signals, another primary signal amplifying means amplifying said clipped primary signals, primary signal Schmitt trigger means receiving signals from said another amplifying means and squaring said signals, means receiving said squared primary signals and generating a primary computer signal for each primary signal received, each primary computer signal having a plurality of pulses determined by the frequency of a squared primary signal, means for counting the number of pulses in each primary computer signal, means for integrating like primary computer signals during an epoch of time, means for recording said integrated signals, means receiving primary signals from said filter means and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, means receiving said squared first derivative signals and generating a first derivative computer signal for each first derivative signal received, each first derivative computer signal having a plurality of pulses determined by the frequency of a squared first derivative signal, means for counting the number of pulses in each first derivative computer signal, means for integrating like first derivative computer signals during an epoch of time, means for recording said integrated signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivativeative signals, means receiving said squared second derivative signals and generating a second derivative computer signal for each second derivative signal received, each second derivative computer signal having a plurality of pulses determined by the frequency of a squared second derivative signal, means for counting the number of pulses in each second derivative computer signal, means for integrating like second derivative computer signals during an epoch of time, and means for recording said integrated signals.

16. Apparatus for analyzing wave shapes comprising, means for receiving waves and generating primary electrical signals having substantially the same wave form as the received wave, means receiving primary signals from said primary signal generator and generating a first derivative signal from said primary signal, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said derivative signals, means receiving said squared first derivative signals and generating a first derivative computer signal for each first derivative signal received, each first derivative computer signal having a plurality of pulses determined by the frequency of a squared first derivative signal, means for counting the number of pulses in each first derivative computer signal, means for integrating like first derivative computer signals duriing an epoch of time, and means for recording said integrated signals.

17. Apparatus for analyzing wave shapes comprising, means for receiving waves and generating primary electrical signals having substantially the same wave form as the received waves, means receiving primary signals from said primary signal generator and generating a first derivative signal from said primary signal, means receiving first derivative signals from said first derivative generator and generating a second derivative signal from said first derivative signal, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, means receiving said squared second derivative signals and generating a second derivative computer signal for each second derivative signal received, each second derivative computer signal having a plurality of pulses determined by the frequency of a squared second derivative signal, means for counting the number of pulses in each second derivative computer signal, means for integrating like second derivative computer signals during an epoch of time, and means for recording said integrated signals.

18. Apparatus for analyzing wave shapes comprising, means for receiving waves and generating primary electrical signals having substantially the same wave form as the received waves, means receiving primary signals from said primary signal generator and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, means receiving said squared first derivative signals and generating a first derivative computer signal for each first derivative signal received, each first derivative computer signal having a plurality of pulses determined by the frequency of a squared first derivative signal, means for counting the number of pulses in each first derivative computer signals, means for integrating like first derivative computing signals during an epoch of time, means for recording said integrated signals, means receiving first derivative signals from said first derivative generator and generating second derivative signals from said first derivative signals, a plurality of alternately arranged and series connected second derivative amplifying means and second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, means receiving said squared second derivative signals and generating a second derivative computer signal for each second derivative signal received, each second derivative computer signal having a plurality of pulses determined by the frequency of a squared second derivative signal, means for counting the number of pulses in each second derivative computer signal, means for integrating like second derivative computer signals during an epoch of time, and means for recording said integrated signals.

19. Apparatus comprising, means for generating a primary electrical signal, primary signal amplifying means amplifying the signal, primary signal limiting means receiving primary signals from said primary signal amplifying means and clipping said received signals, another primary signal amplifying means amplifying said clipped primary signals, primary signal Schmitt trigger means receiving signals from said another amplifying means and squaring said signals, means receiving primary signals from said primary signal generator and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, means for transmitting said primary, first and second derivative squared signals to a remote location, means for receiving said primary, first and second derivative squared signals, and means for mixing and integrating said primary, first and second derivative squared signals.

20. Apparatus comprising, means for generating a primary electrical signal, primary signal amplifying means amplifying the signal, primary signal limiting means receiving primary signals from said primary signal amplifying means and clipping said received signals, another primary signal amplifying means amplifying said clipped primary signals, primary signal Schmitt trigger means receiving signals from said another amplifying means and squaring said signals, means receiving primary signals from said primary signal generator and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, means for transmitting said primary, first and second derivative squared signals to a remote location, means for receiving said primary, first and second derivative squared signals, means for mixing and integrating said primary, first and second derivative squared signals, and means for integrating said mixed signals.

21. Apparatus comprising, means for generating a primary electrical signal, primary signal amplifying means amplifying the signal, primary signal limiting means receiving primary signals from said primary signal amplifying means and clipping said received signals, another primary signal amplifying means amplifying said clipped primary signals, primary signal Schmitt trigger means receiving signals from said another amplifying means and squaring said signals, means receiving primary signals from said primary signal generator and generating first derivative signals from said primary signals, a plurality of alternately arranged series connected first derivative amplifying means and first derivative limiting means receiving first derivative signals from said first derivative generator and alternately amplifying and clipping received first derivative signals, first derivative Schmitt trigger means receiving said amplified and clipped first derivative signals and squaring said first derivative signals, means receiving first derivative signals from said first derivative generator and generating second derivative signals from said first derivative signals, a plurality of alternately arranged and series connected second derivative amplifying means and second derivative limiting means receiving second derivative signals from said second derivative generator and alternately amplifying and clipping said second derivative signals, second derivative Schmitt trigger means receiving said amplified and clipped second derivative signals and squaring said second derivative signals, means for transmitting said primary, first and second derivative squared signals to a remote location, means for receiving said primary, first and second derivative squared signals, means for mixing and integrating said primary, first and second derivative squared signals, means for integrating said mixed signals, and filtering means for filtering said signals to filter out frequencies above a selected frequency.

22. Apparatus comprising, means generating an original signal, means generating a first and second derivative signal from said original signal, means squaring said original and said first and second derivative signals, means transmitting said three signals to a remote location, and means mixing and integrating said three signals at said remote location to reconstruct said original signal.

References Cited in the file of this patent

UNITED STATES PATENTS

| | | |
|---|---|---|
| 2,304,740 | Minton | Dec. 8, 1942 |
| 2,537,589 | Johnson | Jan. 9, 1951 |
| 2,701,328 | Woodruff | Feb. 1, 1955 |
| 2,803,801 | Cunningham | Aug. 20, 1957 |
| 2,924,777 | Lieu, et al. | Feb. 9, 1960 |

OTHER REFERENCES

An Improved Low Freezing Analyzer, article in Electrical Engineering, November 1943, pp. 236–239.

Electroencephalography, article in Radio-Electronics, April 1955, pp. 56–57.